US012766819B2

(12) United States Patent
Goto et al.

(10) Patent No.: US 12,766,819 B2
(45) Date of Patent: Oct. 20, 2026

(54) CO-EXTRUDED SHEET AND RESIN-MOLDED PRODUCT

(71) Applicant: MAXELL, LTD., Otokuni-gun (JP)

(72) Inventors: Toshiharu Goto, Otokuni-gun (JP); Satoshi Yamamoto, Otokuni-gun (JP); Kei Mizutani, Otokuni-gun (JP)

(73) Assignee: MAXELL, LTD., Kyoto (JP)

( * ) Notice: Subject to any disclaimer, the term of this patent is extended or adjusted under 35 U.S.C. 154(b) by 332 days.

(21) Appl. No.: 18/575,112

(22) PCT Filed: Feb. 28, 2023

(86) PCT No.: PCT/JP2023/007276

§ 371 (c)(1),
(2) Date: Dec. 28, 2023

(87) PCT Pub. No.: WO2023/189108

PCT Pub. Date: Oct. 5, 2023

(65) Prior Publication Data

US 2025/0033336 A1 Jan. 30, 2025

(30) Foreign Application Priority Data

Mar. 31, 2022 (JP) ................................. 2022-059975

(51) Int. Cl.
*B32B 27/36* (2006.01)
*B32B 27/06* (2006.01)

(52) U.S. Cl.
CPC .......... *B32B 27/365* (2013.01); *B32B 27/065* (2013.01); *B32B 2250/03* (2013.01);
(Continued)

(58) Field of Classification Search
CPC ................ B32B 27/365; B32B 27/065; B32B 2250/03; B32B 2250/244; B32B 2250/40;
(Continued)

(56) References Cited

U.S. PATENT DOCUMENTS

| | | | | |
|---|---|---|---|---|
| 6,492,015 | B1 | 12/2002 | Aoki et al. | |
| 10,632,663 | B2 | 4/2020 | Yusa et al. | |
| 2016/0082693 | A1 * | 3/2016 | Li ............................ | B65D 3/12 428/318.6 |

FOREIGN PATENT DOCUMENTS

| | | |
|---|---|---|
| JP | H08-174780 A | 7/1996 |
| JP | 2000-052370 A | 2/2000 |

(Continued)

OTHER PUBLICATIONS

Jun. 5, 2025 Extended European Search Report issued in European Patent Application No. 23779138.9.

*Primary Examiner* — Michael C Miggins
(74) *Attorney, Agent, or Firm* — Oliff PLC

(57) ABSTRACT

A co-extruded sheet contains a polycarbonate resin, and includes a core layer formed from a foam resin, a skin layer formed from a non-foaming resin and laminated to one major surface of the core layer, and a second skin layer laminated to another major surface of the core layer. A melt volume-flow rate of the polycarbonate resin contained in the core layer (MVRc) and a melt volume-flow rate of the polycarbonate resin contained in one of the skin layers (MVRs) satisfy the following expression, (1):

$$1.5 \leq MVRs/MVRc \leq 8.0. \quad (1)$$

9 Claims, 5 Drawing Sheets

(52) U.S. Cl.
CPC ..... *B32B 2250/244* (2013.01); *B32B 2250/40* (2013.01); *B32B 2266/0264* (2013.01); *B32B 2307/72* (2013.01); *B32B 2307/7376* (2023.05); *B32B 2439/02* (2013.01)

(58) Field of Classification Search
CPC ........ B32B 2266/0264; B32B 2307/72; B32B 2307/7376; B32B 2439/02; B32B 2307/30; B32B 5/18; B32B 27/36; B29C 44/0461; B29C 44/14; B29C 44/505; B29C 48/0017; B29C 51/02; B29C 48/0012; B29C 48/07; B29C 51/10; B29C 48/21; B29C 44/00; B29C 48/08; B29K 2069/00; B29K 2105/04; B29L 2009/00; B29L 2031/712; B29L 2031/7692
See application file for complete search history.

(56) References Cited

FOREIGN PATENT DOCUMENTS

| | | | |
|---|---|---|---|
| JP | 2001-105557 | A | 4/2001 |
| JP | 3568655 | B2 | 9/2004 |
| JP | 3654697 | B2 | 6/2005 |
| JP | 3828279 | B2 | 10/2006 |
| JP | 4446412 | B2 | 4/2010 |
| JP | 6139038 | B1 | 5/2017 |

* cited by examiner

CO-EXTRUDED SHEET AND RESIN-MOLDED PRODUCT

TECHNICAL FIELD

The present disclosure relates to a co-extruded sheet containing an engineering plastic, particularly a polycarbonate resin, and a resin-molded product.

BACKGROUND ART

Recently, the attention paid to foam resin has been growing as it can achieve a weight reduction of a resin molding to increase convenience and also help reduce emissions of carbon dioxide. Methods of molding a foam resin include physical foam molding and chemical foam molding. Chemical foam molding uses a blowing agent that is a chemical blowing agent. Chemical blowing agents have a high environmental burden and thus are not preferable from the viewpoint of protecting the earth's environment. Physical foam molding uses a blowing agent that is a physical blowing agent, such as nitrogen or carbon dioxide. Physical blowing agents have a low environmental burden and thus are preferable from the viewpoint of protecting the earth's environment. One physical foam-molding method that foams engineering plastics and/or super engineering plastics with high heat resistance involves shearing and kneading molten engineering and/or super engineering plastic resins together with a supercritical fluid at high pressure and dissolving them all.

Japanese Patent No. 6139038 (Patent Document 1) discloses a method of manufacturing a foam molding using a physical blowing agent such as nitrogen or carbon dioxide at relatively low pressure, instead of a high-pressure supercritical fluid. This method enables formation of fine foam cells in a resin molding with a relatively simple process using a physical blowing agent at low pressure without using special high-pressure equipment. Patent Document 1 further discloses a method of forming a foam molding by injection molding and extrusion molding.

Injection molding enables production of a foam molding with a complex shape. However, the surface layer of the molten resin flows around within the mold while being cooled and solidified. In this process, a relatively thin non-foamed skin layer is formed as the surface layer of the foam molding. On the other hand, extrusion molding, with less mold-size and load restrictions than injection molding, is suitable for consecutively manufacturing foam moldings of a single shape and a single thickness. In addition, a sheet-shaped foam molding obtained by extrusion molding may be vacuum formed, for example, to shape it into a shape that is complex to some degree or into a relatively large size, for example. However, with extrusion molding, when the molten resin is discharged through the die outlet and cooled and solidified, a skin layer cannot be readily formed on the surface of the foam molding. Foam moldings with a relatively thin skin layer and foam moldings without a skin layer have a surface with inferior appearance design quality compared with foam moldings with a skin layer of sufficient thickness. Another problem with a foam molding obtained by extrusion molding is that pressure release during discharge of the molten resin through the die outlet destroys air bubbles, potentially causing irregularities on the surface of the foam molding and thus degrading appearance design quality.

In addition, Patent Document 1 does not consider a foam molding of a polycarbonate resin composed of an amorphous resin that is vacuum formable, nor does it consider ensuring the surface smoothness of the foam molding when heated to a temperature exceeding the glass-transition temperature of the polycarbonate resin. As after as non-foaming resins are concerned, crystalline resins are unlikely to experience significant deformation or dimensional change when heated at a temperature higher than the glass transition temperature but lower than the melting point. However, among non foaming resins, amorphous resins are susceptible to thermal deformation when heated to a temperature higher than the glass-transition temperature (the glass-transition temperature of polycarbonate resin is about 145° C.). This suggests that, when a foam molding made of an amorphous resin (i.e., polycarbonate resin) is heated at a temperature not lower than its glass-transition temperature, it is more difficult to prevent deformation of its surface, such as swelling of the surface of the foam resin caused by bubbles formed inside the foam molding, or dimensional changes of the foam molding.

To form a skin layer with sufficient thickness, Japanese Patent No. 3654697 (Patent Document 2) discloses a method of manufacturing a thermoplastic-resin foam sheet. This method of manufacturing a thermoplastic-resin foam sheet allows a skin layer to be formed readily on the surface of the thermoplastic-resin foam sheet by extrusion molding. JP 2000-52370 A (Patent Document 3) discloses a method of manufacturing a multi-layer laminated molding. This multi-layer laminated molding is formed by co-extrusion molding, including a core layer and skin layers made of a foam resin. The manufacturing methods of Patent Documents 2 and 3 use commodity plastics with relatively low heat resistance and mechanical strength, such as polypropylene or polystyrene, as the main resin material, and do not use an engineering plastic with good heat resistance and mechanical strength, particularly a polycarbonate resin. Further, the objectives of the manufacturing methods of Patent Documents 2 and 3 are to enable easy or stable manufacturing of a foam molding, and not to improve heat resistance and mechanical strength. Further, they cannot enable a weight reduction if the thickness of the skin layer is too large, i.e., the thickness of the core layer is too small.

Japanese Patent No. 3568655 (Patent Document 4) discloses an extruded laminated foam sheet of a polycarbonate-based resin having a plurality of extruded foam sheets of the polycarbonate-based resin bonded together. However, the extruded laminated foam sheet of a polycarbonate-based resin of Patent Document 4 is produced by cutting and laminating extruded foam sheets of the polycarbonate-based resin to produce a polycarbonate-based resin foam sheet with a relatively large thickness; the skin layer at the surface is not regulated.

Yet another problem with a resin molding made of a foam resin is that reducing its density to improve light-weight properties decreases its mechanical strength. Particularly, a foam molding made of a polycarbonate resin required to have mechanical strength is disadvantageous relative to a resin molding made of an amorphous resin, due to the significantly lower mechanical strength of the former.

JP H08-174780 A (Patent Document 5; "H08" stands for Heisei 8, i.e., the year 1996) discloses an extruded laminated polycarbonate-resin foam sheet with high expansion ratio produced by co-extrusion molding. This extruded laminated polycarbonate-resin foam sheet has good heating workability, particularly deep drawing workability, and also has good appearance design quality and mechanical strength. Patent Document 5 discloses heating-induced dimensional changes occurring when the extruded laminated polycarbonate-resin foam sheet is heated in an atmosphere at a relatively low temperature of 170° C.

Japanese Patent No. 4446412 (Patent Document 6) discloses a multi-layer polycarbonate resin laminate. The multi-layer polycarbonate resin laminate includes a polycarbonate resin foam and a polycarbonate-resin film layer laminated and bonded to at least one side thereof. The melt tension of the resin(s) forming the film layer(s) at 250° C. is not lower than 2.45 cN. Thus, in the multi-layer polycarbonate resin laminate, the surface condition does not deteriorate or physical properties do not decrease during heating of the multi-layer sheet in hot vacuum forming, nor, during folding, does the folded portion experience fissure or cracking.

Japanese Patent No. 3828279 (Patent Document 7) discloses a polycarbonate-based resin foam plate. The polycarbonate-based resin foam plate includes a polycarbonate-based resin foam sheet and a polycarbonate-based resin film or sheet formed on at least one side thereof. This document focuses on various conditions such as the density or thickness of the polycarbonate-based resin foam sheet and provides a polycarbonate-based resin foam plate with improved surface appearance and bending strength.

PRIOR ART DOCUMENTS

Patent Documents

Patent Document 1: Japanese Patent No. 6139038
Patent Document 2: Japanese Patent No. 3654697
Patent Document 3: JP 2000-52370 A
Patent Document 4: Japanese Patent No. 3568655
Patent Document 5: JP H08-174780 A
Patent Document 6: Japanese Patent No. 4446412
Patent Document 7: Japanese Patent No. 3828279

SUMMARY OF THE INVENTION

In recent years, there has been a growing demand that, in thermally shaping a co-extruded sheet into a desired shape by vacuum forming, for example, one should be able to form the sheet in a short period of time using a relatively high heating temperature of 200° C. or higher and utilizing drawdown (a phenomenon in which a molten resin sags due to its own weight) to improve productivity. Particularly, when a co-extruded sheet having a core layer made of a foam resin and skin layers made of a non foaming resin laminated to the major surfaces of the core layer is heated at a high temperature of 200° C. or higher, bubbles in the core layer coated with the skin layers thermally expand and can easily merge. As a result, after the co-extruded sheet has been thermally shaped by vacuum forming, for example, the strengths of portions with merged bubbles may be lower. Furthermore, depending on the resin material chosen for the skin and core layers, the drawdown may be too fast or too slow, which may deteriorate vacuum formability or prolong the time required for thermal shaping such as vacuum forming (hereinafter referred to as "tact time"). None of Patent Document 1 to 7 proposes an extruded laminated polycarbonate-resin foam sheet, for example, that would provide improved efficiency during vacuum forming, i.e., could be vacuum formed at higher temperatures and in shorter periods of time, and have reduced merged bubbles after vacuum forming to improve mechanical strength.

In addition, a laminated polycarbonate-resin foam sheet with high expansion ratio as shown in Patent Document 5, while providing good light-weight properties, has a lower mechanical strength than a laminated polycarbonate-resin foam sheet with low expansion ratio.

The present inventors conducted extensive research and discovered that the MVR of the resin used for the core layer and skin layers of a co-extruded sheet can be adjusted to be in a certain range to provide a co extruded sheet, including a core layer made of a foam resin intended to reduce weight, that provides improved production efficiency during thermal shaping such as vacuum forming and, at the same time, provides improved mechanical strength after thermal shaping such as vacuum forming.

An object of the present disclosure is to provide a co-extruded sheet containing a polycarbonate resin that provides improved production efficiency during thermal shaping such as vacuum forming and, at the same time, provides improved mechanical strength after thermal shaping such as vacuum forming, and a resin-molded product made of such a co extruded sheet.

To solve the above-identified problems, the present disclosure provides the following solution: A co-extruded sheet according to the present disclosure may contain a polycarbonate resin and include: a core layer formed from a foam resin; a first skin layer formed from a non-foaming resin and laminated to one major surface of the core layer; and a second skin layer laminated to another major surface of the core layer. A melt volume-flow rate of the polycarbonate resin contained in the core layer (hereinafter referred to as MVRc) and a melt volume-flow rate of the polycarbonate resin contained in one of the first and second skin layers (hereinafter referred to as MVRs) may satisfy the following expression, (1):

$$1.5 \leq MVRs/MVRc \leq 8.0. \quad (1)$$

The co-extruded sheet and resin-molded product according to the present disclosure will provide improved production efficiency during thermal shaping such as vacuum forming and, at the same time, provide improved mechanical strength after thermal shaping such as vacuum forming.

EMBODIMENTS FOR CARRYING OUT THE INVENTION

Figure 1:
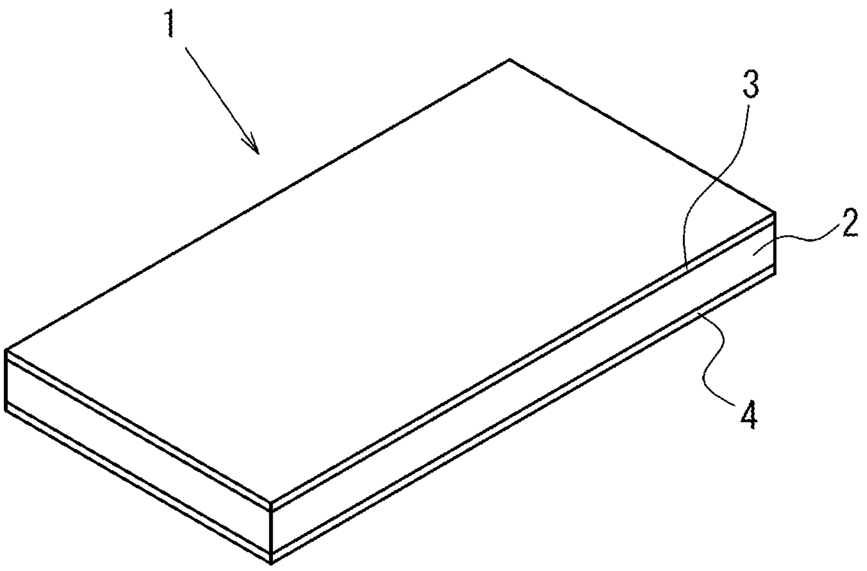
FIG. 1 is a perspective view of a co-extruded sheet according to embodiments.

To solve the above-identified problems, the present disclosure provides the following solution: A co-extruded sheet according to the present disclosure may contain a polycarbonate resin and include: a core layer formed from a foam resin; a first skin layer formed from a non-foaming resin and laminated to one major surface of the core layer; and a second skin layer laminated to another major surface of the core layer. A melt volume-flow rate of the polycarbonate resin contained in the core layer (hereinafter referred to as MVRc) and a melt volume-flow rate of the polycarbonate resin contained in one of the first and second skin layers (hereinafter referred to as MVRs) may satisfy the following expression, (1):

$$1.5 \leq MVRs/MVRc \leq 8.0. \tag{1}$$

This will improve production efficiency during thermal shaping such as vacuum forming, i.e., reduce tact time, and, at the same time, improve mechanical strength after thermal shaping such as vacuum forming.

The co-extruded sheet may satisfy the following expression, (2):

$$1.5 \leq MVRs/MVRc \leq 2.5. \tag{2}$$

This will further improve production efficiency during thermal shaping such as vacuum forming.

The co extruded sheet may satisfy the following expression, (3):

$$1.7 \leq MVRs/MVRc \leq 2.3. \tag{3}$$

This will improve mechanical strength after thermal shaping such as vacuum forming while reducing tact time and, in addition, provide good surface smoothness.

The co-extruded sheet may have an apparent density of 0.4 to 0.8 g/cm$^3$.

The co-extruded sheet may have a thickness of 1.5 to 6 mm.

The co-extruded sheet may satisfy the following expression, (4):

$$0.10 \leq (t1 + t2)/T \leq 0.5. \tag{4}$$

In expression (4), t1 indicates a thickness of the first skin layer, t2 indicates a thickness of the second skin layer, and T indicates a thickness of the co-extruded sheet.

A resin-molded product of the present disclosure may be made from the co-extruded sheet.

Now, embodiments of the co-extruded sheet, denoted by numeral 1, of the present disclosure will be specifically described with reference to FIGS. 1 to 5. The same and corresponding elements in the drawings are labeled with the same reference characters, and their description will not be repeated. For ease of explanation, the drawings to which reference will be made below show elements in a simplified or schematic manner, and/or do not show some elements.

The co-extruded sheet 1 is made of a polycarbonate resin. The co-extruded sheet 1 according to the present embodiments has a sheet shape. The co-extruded sheet 1 is produced by co-extrusion molding of a molten polycarbonate resin. The resin used in the present disclosure may be any other engineering plastic that contains a polycarbonate resin. The co-extruded sheet 1, which contains a polycarbonate resin, has good toughness. An engineering plastic is a thermoplastic resin with an under-load deflection temperature not lower than 100° C. The engineering plastic may be, for example, a polycarbonate resin (PC) or, instead, a modified polyphenylene ether (m-PPE) or syndiotactic polystyrene (SPS), for example. The resin used in the co extruded sheet 1 of the present disclosure may contain at least one selected from the group consisting of these engineering plastics. The resin material of the co-extruded sheet 1 is only required to be an extrusion-moldable engineering plastic. An ultraviolet absorbing agent and/or an anti-aging agent, for example, may be added to the resin material of the co-extruded sheet 1.

As shown in FIG. 1, the co-extruded sheet 1 includes a core layer 2, a skin layer 3 laminated to one major surface of the core layer 2, and a skin layer 4 laminated to the other major surface of the core layer 2.

The core layer 2 is formed from a foam resin. The core layer 2 may be formed by foam molding of a molten polycarbonate resin. This means that the core layer 2 has a large number of air bubbles. Each of these bubbles has a generally elliptic shape extended in the direction of extrusion in a cross-sectional view of the layer taken along a plane in the direction of extrusion during extrusion molding and in the thickness direction. Bubbles contained in the core layer 2 that are located at and near the middle of the core layer 2 as determined along the thickness direction has larger bubble diameters than bubbles 21 located near the ends of the core layer 2 as determined along the thickness direction. The bubble diameter of bubbles 21 gradually decreases as it goes from the middle of the core layer 2 as determined along the thickness direction toward the ends thereof as determined along the thickness direction.

The skin layer 3 is formed from a non-foaming resin. This means that the skin layer 3 is not foam molded. The skin layer 3 is extruded by co-extrusion molding through the die outlet in a non-foamed state and laminated integrally to the core layer 2. The skin layer 3 has a thickness t1.

The skin layer 3 may use a thermoplastic resin that can bond well to the core layer 2. More specifically, it is particularly preferable that the resin material of the skin layer 3 is the same resin material that forms the core layer 2. Further, to strengthen the skin layer 3, the skin layer 3 may be formed from a reinforced resin containing an inorganic filler. This construction of the skin layer 3 will achieve both weight reduction and improvement of strength while efficiently improving strength. The inorganic filler may be, for example, glass fiber, carbon fiber, aramid fiber, talc or mica.

The skin layer 4 is the same as the skin layer 3 except that it is laminated to the other major surface of the core layer 2. As such, no specific description of the skin layer 4 will be given.

The melt volume-flow rate of the polycarbonate resin contained in the skin layer 3 (hereinafter referred to as MVRs) is equal to the melt volume-flow rate of the polycarbonate resin contained in the core layer 2 (hereinafter referred to as MVRc) or higher than MVRc. To reduce tact time to improve production efficiency and, at the same time, reduce merged bubbles after thermal shaping such as vacuum forming to improve mechanical strength, MVRs and MVRc satisfy the following expression, (1):

$$1.5 \leq MVRs/MVRc \leq 8.0. \tag{1}$$

Further, to reduce tact time, the flow rates preferably satisfy the following expression, (2):

$$1.5 \leq MVRs/MVRc \leq 2.5. \tag{2}$$

Furthermore, to provide good surface smoothness after thermal shaping such as vacuum forming, the flow rates more preferably satisfy the following expression, (3):

$$1.7 \leq MVRs/MVRc \leq 2.3. \quad (3)$$

As MVRs is higher than MVRc, directly after discharge through the die outlet during extrusion molding, the temperature of the resin forming the skin layer 3 can be lowered as much as possible. This reduces the viscosity of the skin layer 3 inside the die, which allows the skin layer 3 to be extruded at a lower temperature. As a result, the core layer 2 can be cooled by heat conduction via the skin layer 3, thereby preventing swelling or rupturing of the surface of the skin layer 3 that would be caused by foaming of the resin contained in the core layer 2. Further, as MVRs is higher than MVRc, the skin layer 3 can easily be thermally deformed, which facilitates drawdown during vacuum forming, thereby reducing tact time. This results in a co-extruded sheet 1 that prevents rupturing of bubbles during vacuum forming. Further, if the value of MVRs/MVRc is lower than 1.5, the effect of reducing resin temperature during extrusion molding is small, which makes it difficult to prevent swelling or rupturing of the surface of the skin layer 3. On the other hand, if the value of MVRs/MVRc is higher than 8.0, the core layer 2 can be deformed significantly less easily than the skin layer 3 during heating in vacuum forming, which makes it necessary to significantly increase the heating temperature during vacuum forming over the temperature optimal for working the skin layer 3. This leads to excessive deformation of the skin layer 3, which decreases forming efficiency. On the other hand, reducing heating temperature prolongs the pre-heating time for vacuum forming, decreasing production efficiency. In view of this, to provide the appropriate fluidity of the resins forming the core layer 2 and skin layer 3 during extrusion molding and adjusting their viscosity so as to prevent swelling or rupturing of the surface of the skin layer 3, the value of MVRs/MVRc is preferably not lower than 1.7. Further, to improve productivity during vacuum forming, the value of MVRs/MVRc is preferably not higher than 2.5, and most preferably not higher than 2.3. In other words, the value of MVRs/MVRc may be not lower than 1.5 and preferably not lower than 1.7 and may be not higher than 8.0, preferably not higher than 2.5 and more preferably not higher than 2.3, which will ensure improvement of productivity during vacuum forming and the appropriate fluidity of the resins forming the core layer 2 and skin layer 3 during extrusion molding and, at the same time, enable adjusting their viscosity so as to prevent swelling or rupturing of the surface of the skin layer 3. The same applies to the skin layer 4 and core layer 2. Further, values of MVRs/MVRc within the range of 1.5 to 8.0, especially 1.7 to 2.3, can be decided upon taking account of the ratio between the viscosity of the core layer 2 with reduced viscosity due to melting of the blowing agent and the viscosity of the non-foaming skin layer 3, as well as of the viscosity characteristics of the polycarbonate resin and the viscosity characteristics of the polycarbonate resin as found when the blowing agent has melted.

MVRs and MVRc are measured by measuring the resin materials contained in the skin layer 3, skin layer 4 and core layer 2 in accordance with JIS K7210-1:2014 (ISO 1133-1:2011) using so-called "Procedure B", at a measurement temperature of 300° C. and a load of 1.2 kg. The under-load deflection temperature of each layer is measured by peeling the skin layers 3 and 4 of the co-extruded sheet 1 off the core layer 2 and measuring their under-load deflection temperature. The peeling of the skin layers 3 and 4 off the core layer 2 is not limited to any particular method, and may be done by scraping the skin layers 3 and 4 (i.e., exposing the relevant surfaces) using a bandsaw, for example, or by cutting off the skin layers 3 and 4 using an NC cutter, for example.

Figure 2:
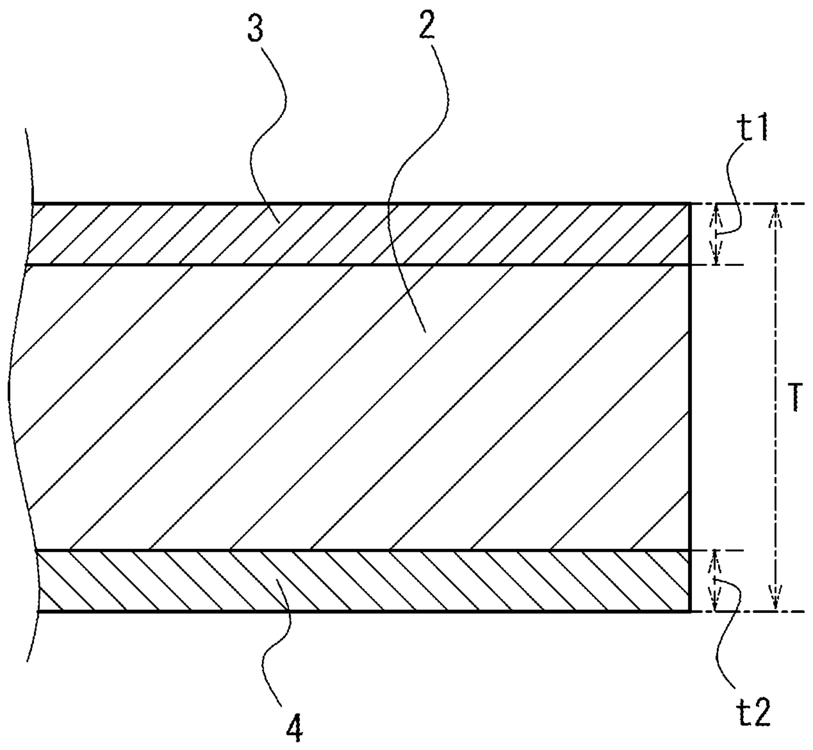
FIG. 2 is a cross-sectional view of the co-extruded sheet shown in FIG. 1.

As shown in FIG. 2, the co-extruded sheet 1 has a thickness T of 1.5 to 6 mm. The skin layer 3 has a thickness t1. The skin layer 4 has a thickness t2.

The thickness t1 of the skin layer 3 and the thickness t2 of the skin layer 4 are measured in the following manner: The co-extruded sheet 1 is cut along the width direction, down in the thickness direction, and the resulting cut surface is observed with a microscope. In the present disclosure, the microscope used is a Type No. VHX-6000 from Keyence Corporation. A magnification of the microscope that allows determination of the bubble diameter at the interface between the skin layer 3 and core layer 2 of the co-extruded sheet 1 is sufficient. The cut surface of the co-extruded sheet 1 is equally divided into 16 sub-sections that are arranged in the width direction; from among the large number of bubbles present in the cut surface of the co extruded sheet 1, 15 bubbles are selected that are located on the imaginary borderlines of the sub sections and close to the surfaces of the co-extruded sheet 1; among these bubbles, the one closest to a surface of the co-extruded sheet 1 is identified. Another imaginary line is drawn that runs through the uppermost point of this closest bubble and perpendicular to the thickness direction. The portion located inward of the imaginary line as determined along the thickness direction is treated as a core layer 2, and the portion located outward along the thickness direction is treated as a skin layer 3. The boundary between the core layer 2 and skin layer 4 is defined in the same manner, and the thickness t1 of the skin layer 3 and the thickness t2 of the skin layer 4 are measured. To provide a thickness T of the co-extruded sheet 1 that is as uniform as possible upon co-extrusion molding, each of the thickness t1 of the skin layer 3 and the thickness t2 of the skin layer 4 is preferably not smaller than 0.050 mm.

The ratio of the total thickness of the skin layers to the thickness T of the co-extruded sheet 1 is to be 0.10 to 0.5, where the total thickness is the sum of the thickness t1 of the skin layer 3 and the thickness t2 of the skin layer 4. That is, the co-extruded sheet 1 is to satisfy the following expression, (4):

$$0.10 \leq (t1 + t2)/T \leq 0.5. \quad (4)$$

If the ratio of the total thickness of the skin layers (t1+t2) to the thickness T of the co extruded sheet 1 is lower than 0.10, the reinforcing effect, in terms of mechanical strength, of the non-foaming resin of the skin layers is insufficiently produced, decreasing a mechanical strength such as specific flexural modulus. On the other hand, if the ratio of the total thickness of the skin layers (t1+t2) to the thickness T of the co-extruded sheet 1 is higher than 0.5, this means increased density of the co-extruded sheet 1. As a result, the co-extruded sheet 1 loses light-weight properties that would otherwise be provided by foaming, and heat conduction requires a longer time, which means a longer pre-heating time for vacuum forming, for example, potentially leading to decreased production efficiency. The ratio of the total thickness of the skin layers (t1+t2) to the thickness T of the co-extruded sheet 1 is preferably in the range of 0.15 to 0.45, and more preferably in the range of 0.2 to 0.4. As the ratio of the total thickness of the skin layers (t1+t2) to the thickness T of the co-extruded sheet 1 is in such a range, the specific flexural modulus of the sheet is improved while the reduced density reduces its weight. Further, as the ratio of the total thickness of the skin layers (t1+t2) to the thickness T of the co extruded sheet 1 is in the range of 0.2 to 0.4, a certain thickness of the core layer 2 is provided in which irregular-sized bubbles have been uniformed, while secondary workability in vacuum forming, for example, is improved. A specific flexural modulus is the flexural modulus of the co-extruded sheet 1 divided by the density of the co-extruded sheet 1. As such, the higher the specific flexural modulus, the better light-weight properties and mechanical strength. The flexural modulus is measured by three-point bending testing (in accordance with ISO 178 or JIS K 7171). The flexural modulus is measured in the atmosphere. The testing rate is 10 mm/min.

Regulating the density of the co-extruded sheet 1 and the thickness of the skin layers 3 and 4 (t1+t2) relative to the thickness T of the co-extruded sheet 1 in this manner will reduce deterioration of the appearance design quality due to swelling etc. of the surface occurring during co-extrusion molding and reduce swelling and/or cracking occurring at the surface during thermal shaping such as vacuum forming and, at the same time, provide good mechanical strength.

The co-extruded sheet 1 has an apparent density of 0.4 to 0.8 g/cm$^3$. The apparent density may be calculated by dividing the weight of the co-extruded sheet 1 by the volume of the co-extruded sheet 1 inclusive of bubbles {apparent density=weight/(area of major surface of co-extruded sheet 1×thickness of co-extruded sheet 1)}. More specifically, a co-extruded sheet 1 with a dimension of 400 mm in the direction of extrusion is cut out. A cut surface thereof along the width direction is equally divided into 11 sub-sections arranged in the width direction, and the thicknesses at 10 points with an equal distance, other than the ends, are measured and the arithmetic mean of these thicknesses is determined, which is treated as the average thickness of the co-extruded sheet 1. The lengths of the sides of the co-extruded sheet 1 in the width direction and in the direction of extrusion are measured using a measuring tape, and the volume of the co-extruded sheet 1 is calculated from the lengths of the sides and the average thickness. In addition, the weight of the co extruded sheet 1 is measured using an electronic balance, and the weight of the co-extruded sheet is divided by its volume to determine the apparent density of the co-extruded sheet 1.

As disclosed in Patent Document 1 mentioned above, the core layer 2 of the present disclosure is preferably foam molded using a physical blowing agent with relatively low pressure, such as nitrogen or carbon dioxide, where nitrogen is more preferable. This will allow the pressure of the physical blowing agent to be set to 1 to 6 MPa, which is relatively low, thereby forming a large number of fine bubbles. This will improve the appearance design quality of the co-extruded sheet 1 and further prevent swelling, for example, during heating at a high temperature in vacuum forming. The average bubble diameter of bubbles is to be not smaller than 0.1 mm, and not larger than 1.0 mm, and preferably not larger than 0.3 mm.

The co-extruded sheet 1 is shaped into various shapes through vacuum forming. Typically, during vacuum forming, the co-extruded sheet 1 is heated to about 200° C., which initiates drawdown, and then deposited on the die, for example, and experiences vacuum suction so as to be shaped. This means that the amount of deformation of the co-extruded sheet 1 due to the heating during vacuum forming (i.e., dimensional change ratio during heating) is preferably small. When the co-extruded sheet 1 is heated for 30 minutes in an atmosphere at 200° C., the co-extruded sheet may have a dimensional change ratio of −5% to 0% in the direction of extrusion. Further, the co-extruded sheet 1 may have a dimensional change ratio of −5 to 0% in the width direction. In other words, the co-extruded sheet 1 has a dimensional change ratio of −5 to 0% in one of the direction of extrusion and the width direction. Alternatively, the co-extruded sheet 1 has a dimensional change ratio of −5 to 0% in both the direction of extrusion and the width direction. The width direction is the direction perpendicular to the above-mentioned direction of extrusion in planner view. Thus, the co-extruded sheet 1 has good dimensional stability during heating.

The dimensional change ratio in the direction of extrusion can be calculated by the following expression:

$$\text{dimensional change ratio in direction of extrusion (\%)} = \{(\text{gauge length in direction of extrusion after heating} - \text{gauge length in direction of extrusion before heating})/\text{gauge length in direction of extrusion before heating}\}\times 100$$

The dimensional change ratio in the width direction can be calculated by the following expression:

$$\text{dimensional change ratio in width direction (\%)} = \{(\text{gauge length in width direction after heating} - \text{gauge length in width direction before heating})/\text{gauge length in width direction before heating}\}\times 100$$

Figure 3:
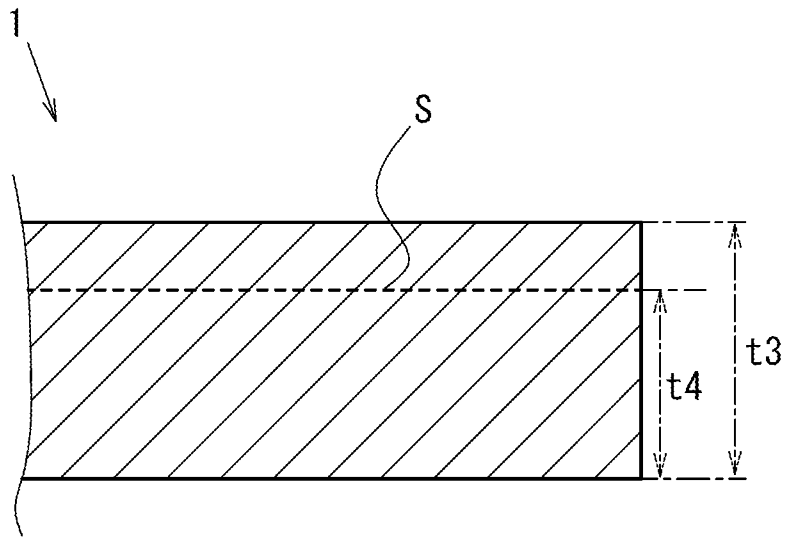
FIG. 3 is a cross-sectional view of the co-extruded sheet as found after heating.

The co-extruded sheet 1 is thermally shaped into a desired shape mainly through vacuum forming, for example. When a sheet from co-extrusion molding is heated, swelling (i.e., a swollen portion) may be caused on the surface of the sheet, which may deteriorate the appearance design quality of the sheet surface. In view of this, it is preferable to prevent the co extruded sheet 1 from developing a swollen portion. As shown in FIG. 3, when the co-extruded sheet 1 is heated for 30 minutes in a heated atmosphere at 250° C., the average thickness t3 of the co-extruded sheet 1 after heating is not larger than 1.5 times the average thickness t4 of the co-extruded sheet before heating. The broken line denoted by S in FIG. 3 indicates the surface of the co-extruded sheet 1 before heating. That is, the co-extruded sheet 1 is prevented from developing a swollen portion due to heating, thereby reducing a change in thickness as determined by comparing the sheet before heating and the sheet after heating. As such, the co extruded sheet 1 provides improved appearance design quality upon thermal shaping such as vacuum forming.

Figure 4:
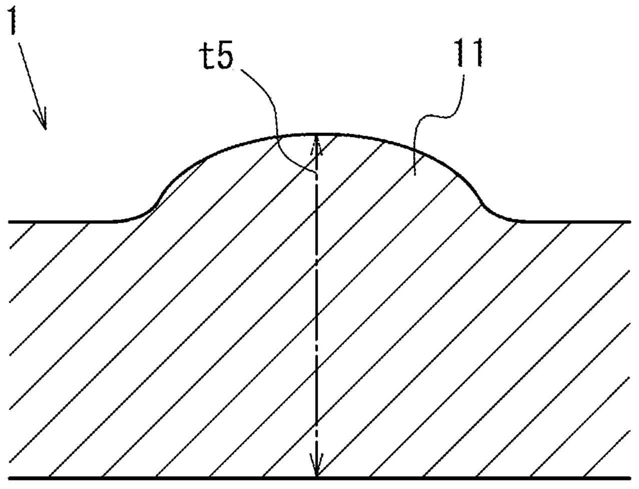
FIG. 4 is a cross-sectional view of the co-extruded sheet as found after heating.

Further, as shown in FIG. 4, the thickness t5 of the co-extruded sheet inclusive of the above-discussed swollen portion 11 is not larger than 1.5 times the average thickness t4 of the co-extruded sheet before heating shown in FIG. 3. The co-extruded sheet 1 after heating has not more than one swollen portion 11 per 100 cm$^2$ of its surface. That is, in the co extruded sheet 1, the height of the swollen portion 11 produced on the surface due to the heating is reduced, and the number of swollen portions 11 produced is also reduced. Thus, the co-extruded sheet 1 provides improved appearance design quality upon thermal shaping such as vacuum forming.

The co-extruded sheet 1 may contain a large number of scale-like filler particles. The scale-like filler may be, for example, an inorganic filler, such as talc, calcium carbonate, mica, clay, boron nitride, wollastonite, potassium titanate, or glass flakes. The scale-like filler may be surface treated with a silane-based coupling agent, a titanate-based coupling agent, a phosphate ester-based coupling agent, or fatty acid-based coupling agent, for example. The scale-like filler particles have an aspect ratio not lower than 5. The aspect ratio is calculated by dividing the average diameter of the scale-like filler particles by their average thickness (average particle diameter/average thickness). If the aspect ratio of the scale-like filler particles is too low, it will be difficult to achieve good surface smoothness. In view of this, the aspect ratio of the scale-like filler particles is preferably not lower than 10, and more preferably not lower than 30. However, if the aspect ratio is too high, the flow rate of the mixed molten resin inside the die cannot easily be controlled during the manufacturing process described further below, which may deteriorate surface smoothness. In addition, an increase in the viscosity of the mixed molten resin during extrusion molding will be too large, which will generate heat inside the extrusion-molding equipment, as will be discussed further below, potentially causing thermal degradation of the thermoplastic resin. In view of this, the aspect ratio of the scale-like filler particles is to be lower than 50. The specific surface area of the scale-like filler is preferably 5 to 20 $m^2/g$. If the specific surface area of the scale-like filler is too small, surface smoothness is less likely to be achieved by sliding of the scale-like filler at the surface; if the specific surface area is too large, the resistance of the scale-like filler in the molten resin will be large and, as a result, it will be difficult to properly orient the scale-like filler particles.

The core layer 2 may contain, in a region near the boundary with the skin layer 3, scale-like filler particles oriented generally parallel to the boundary surface between the core layer 2 and skin layer 3. The near-boundary region is a defined, as determined along the thickness direction of the core layer 2, by the boundary surface between the core layer 2 and sky layer 3 and a position a thickness of 5% of the core-layer thickness away from the boundary surface. The bubbles contained in the core layer 2 have a shape extended along the direction of extrusion during extrusion molding. The scale-like filler particles are also oriented generally parallel to the bubble walls of the bubbles extended along the direction of extension, thereby improving the strength of the bubble walls. This will prevent rupturing along the direction of extrusion of the co-extruded sheet 1. “Scale-like filler particles being generally parallel” means that, in a cross section obtained by cutting the co-extruded sheet 1 in the thickness direction along the direction of extrusion during extrusion molding, the scale-like filler particles have an inclination not less than 0° and less than 5° relative to the boundary surface between the core layer 2 and skin layer 3. In other words, it means that the surfaces (i.e., major surfaces) of the scale-like filler particles face the boundary surface of the core layer 2 and skin layer 3 so as to be generally parallel to the surface. The same applies to the orientation of scale-like filler particles located in the core layer 2 and near the boundary between the core layer 2 and skin layer 4.

The orientation of a large number of scale-like filler particles contained in the region near the boundary between the core layer 2 and skin layer 3 were calculated in the following manner: First, in a cross section in a plane in the thickness direction and along the direction of extrusion during extrusion molding, 50 electron micrographs of 150 by 150 μm were taken, all with an equal distance from the front end to the rear end along the direction of extrusion in the near-boundary region and in the middle of the near-boundary region along the thickness direction. From among all the scale-like filler particles contained in these 50 electron micrographs, the ones oriented generally parallel to the boundary surface between the core layer 2 and skin layer 3 were identified. Then, the proportion of the scale like filler particles oriented generally parallel in the large number of scale-like filler particles contained in the near-boundary region was calculated.

The core layer 2 may contain, in a middle region of the core layer 2 along the thickness direction, scale-like filler particles oriented with an angle of 5° to 90° relative to the surfaces of the co-extruded sheet 1. The middle region is a region with a thickness of 25% beginning at the middle along the thickness direction toward the boundary surface between the core layer 2 and skin layer 3, where the thickness of the core layer 2 is 100%. Preferably not less than 40% of the large number of scale-like filler particles contained in the middle region are oriented with an angle of 5° to 90° relative to the surface S of the co-extruded sheet 1. This will improve the formability of the co-extruded sheet 1. More preferably not less than 60%, and yet more preferably not less than 80%, of the scale-like filler particles are oriented with an angle of 5° to 90° relative to the surface. This will further improve the formability of the co-extruded sheet 1. The bubbles contained in the middle region of the core layer 2 are likely to become larger than those in the near-boundary region discussed above during extrusion molding. This is because the middle region is not as easily cooled after extrusion as the near-boundary region. If the bubbles are too large, this may cause damage to the co-extruded sheet 1. If the scale-like filler particles in the middle region are inclined and randomly disposed between the bubbles, as discussed above, this will reduce growth of bubbles in all directions. This will improve the strength of the co-extruded sheet 1, or its strength during forming, i.e., formability. As a result, when a material constituted by the co-extruded sheet 1 is vacuum formed to fabricate a foam resin-molded product, rupturing of bubbles contained in the co-extruded sheet 1 or damage to the co-extruded sheet 1 will be prevented.

The orientation of the large number of scale-like filler particles contained in the middle region of the core layer 2 can be calculated in the following manner: First, similarly to the near-boundary region, 50 electron micrographs are taken, all with an equal distance and in the middle of the core layer 2 along the thickness direction. From among all the scale like filler particles contained in these 50 electron micrographs, the ones oriented with an angle of 5° to 90° relative to the surface of the co-extruded sheet 1 are identified. Then, the proportion of the scale-like filler particles oriented with an angle of 5° to 90° relative to the surface of the co-extruded sheet 1 in the large number of scale-like filler particles contained in the middle region is calculated.

A method of manufacturing the co-extruded sheet 1 will be described below (not shown). First, resin pellets constituting a resin material are loaded into the screw cylinder of a main extruder. The resin material is a polycarbonate resin. The resin pellets are heated within the screw cylinder to produce a molten resin. Next, a blowing agent is injected into the molten resin from a blowing-agent injection bottle attached to the screw cylinder of the main extruder. The blowing agent is melted into the molten resin by the screw cylinder and kneaded to be uniformly dispersed. This results in a mixed molten resin. The mixed molten resin is discharged through the die outlet to form a core layer 2. Meanwhile, resin pellets constituting a resin material are loaded into each of the screw cylinders of two auxiliary extruders, heated and melted to produce two molten resins. One of the two molten resins is discharged through the associated die outlet to form a skin layer 3, while the other is discharged through the associated die outlet to form a skin layer 4. The mixed molten resin and the two molten resins from their respective extruders are brought together inside a die and discharged through the die outlet, where the skin layer 3 is laminated to one of the major surfaces of the core layer 2 and the skin layer 4 is laminated to the other major surface of the core layer 2. The pressure in the manifold of the die is preferably higher than the pressure of the blowing agent being injected, and more preferably is kept not lower than 10 MPa. This improves the adhesion between the core layer 2 and skin layer 3 and between the core layer 2 and skin layer 4 and, at the same time, prevent rupturing of bubbles in the core layer 2. As a result, the vacuum formability of the co-extruded sheet 1 is improved. The mixed molten resin is foamed during extension through the die outlet into the atmosphere. This results in a co-extruded sheet 1. The foaming method is physical foaming using an inert gas, such as nitrogen or carbon dioxide, as a blowing agent. The co-extruded sheet 1 that has been extruded in this manner is transported by a haul-off machine to a cutter. The cutter cuts the co extruded sheet 1 into a desired shape.

The co-extruded sheet 1 produced in this manner, which is then shaped into a desired shape by vacuum forming, for example, may be used in the following applications: For example, a wide product and part required to have relatively high strength, such as a signboard or a mobility material like an exterior automotive material; a product and part required to have heat resistance, such as a battery or a tray for heat-generating members used in a manufacturing process that includes a heating step; or a product and part required to be light-weight. Since the co-extruded sheet 1 contains a polycarbonate resin and has been foam molded through co-extrusion molding, it is a suitable material for forming such a product or part as listed above or other resin-molded products.

A product and a part, for example, fabricated from the co-extruded sheet 1 help reduce the amount of resin used. As a result, the co-extruded sheet 1 according to the present embodiments will contribute to improving the efficiency with which natural resources are used, to alleviating transportation-related issues, to reducing the amount of energy used, and to reducing $CO_2$ emissions. Offering the co-extruded sheet 1 to society will contribute to achieving some of the 17 Sustainable Development Goals (SDGs) set by the United Nations: Goal 7 (affordable and clean energy); Goal 9 (industry, innovation and infrastructure); and Goal 11 (sustainable cities and communities).

Although embodiments have been described, the present disclosure is not limited to the above-described embodiments, and various modifications are possible without departing from the spirit of the invention.

EXAMPLES

As shown in Table 1 below, test specimens for Inventive Examples 1 to 6 and Comparative Examples 1 to 4 were fabricated, and tests were conducted to evaluate dimensional change ratio, the appearance of a test specimen (i.e., mechanical strength after vacuum forming), and minimum pre-heating time for vacuum forming. The resin material used for these test specimens is a polycarbonate resin. It should be noted that T in Table 1 indicates the thickness of the test specimen. The present disclosure is not limited to these examples.

TABLE 1

| | Manufacturing method | Blowing agent | Thickness of skin layers (t1 + t2) (mm) | Thickness T (mm) | (L1 + L2)/T | Co-extruded sheet density (g/cm$^3$) | MVR_c | MVR_s | MVR ratio | Dimensional change ratio (%) | Appearance of extruded sheet (mechanical strength after vacuum forming) | Optimum heater temp. for. vacuum forming | Minimum pre-heating time for vacuum forming (s) |
|---|---|---|---|---|---|---|---|---|---|---|---|---|---|
| Inv. Ex. 1 | co-extrusion | $N_2$ | 0.38 | 1.5 | 0.25 | 0.51 | 11 | 18 | 1.64 | −0.2 | A | 300 | 110 |
| Inv. Ex. 2 | co-extrusion | $N_2$ | 0.50 | 2.0 | 0.25 | 0.56 | 11 | 18 | 1.64 | −0.1 | A | 300 | 120 |
| Inv. Ex. 3 | co-extrusion | $N_2$ | 0.75 | 3.0 | 0.25 | 0.62 | 11 | 18 | 1.64 | 0.0 | A | 300 | 165 |
| Inv. Ex. 4 | co-extrusion | $N_2$ | 1.28 | 5.1 | 0.25 | 0.75 | 11 | 18 | 1.64 | −0.2 | A | 300 | 250 |
| Inv: Ex. 5 | co-extrusion | $N_2$ | 0.75 | 3.0 | 0.25 | 0.68 | 11 | 24 | 2.18 | 0.0 | A | 300 | 170 |
| Inv. Ex. 6 | co-extrusion | $N_2$ | 0.75 | 3.0 | 0.25 | 0.66 | 2.8 | 18 | 6.43 | −0.2 | A | 280 | 220 |
| Inv. Ex. 7 | co-extrusion | $N_2$ | 0.75 | 3.0 | 0.25 | 0.68 | 8 | 15 | 1.88 | 0.0 | A | 300 | 165 |
| Inv. Ex. 8 | co-extrusion | $N_2$ | 0.75 | 3.0 | 0.25 | 0.68 | 5 | 15 | 3 | 0.0 | A | 300 | 190 |
| Inv. Ex. 9 | co-extrusion | $N_2$ | 0.75 | 3.0 | 0.25 | 0.68 | 8 | 18 | 2.25 | 0.0 | A | 300 | 185 |
| Inv. Ex. 10 | co-extrusion | $N_2$ | 0.16 | 2.0 | 0.08 | 0.50 | 11 | 24 | 2.18 | 0.0 | A | 300 | 120 |
| Inv. Ex. 11 | co-extrusion | $N_2$ | 0.20 | 2.0 | 0.10 | 0.55 | 11 | 24 | 2.18 | 0.0 | A | 300 | 120 |
| Inv. Ex. 12 | co-extrusion | $N_2$ | 1.20 | 2.0 | 0.60 | 0.80 | 11 | 24 | 2.18 | 0.0 | A | 300 | 140 |
| Inv. Ex. 13 | co-extrusion | $N_2$ | 1.00 | 2.0 | 0.50 | 0.80 | 11 | 24 | 2.18 | 0.0 | A | 300 | 120 |
| Comp. Ex. 1 | co-extrusion | $N_2$ | 0.75 | 3.0 | 0.25 | 0.65 | 2.8 | 24 | 8.57 | −0.3 | A | 280 | 280 |
| Comp. Ex. 2 | co-extrusion | $N_2$ | 0.75 | 3.0 | 0.25 | 0.58 | 18 | 18 | 1 | −0.4 | B | 290 | 250 |
| Comp. Ex. 3 | co-extrusion | $N_2$ | 0.75 | 3.0 | 0.25 | 0.55 | 11 | 2.8 | 0.25 | −0.4 | B | 290 | 250 |
| Comp. Ex. 4 | co-extrusion | iso-butane | 1.25 | 5.0 | 0.25 | 0.30 | 18 | 18 | 1 | −10.0 | B | 290 | 280 |
| Comp. Ex. 5 | co-extrusion | $N_2$ | 0.75 | 3.0 | 0.25 | 0.68 | 15 | 18 | 1.2 | −0.4 | B | 290 | 250 |

Inventive Example 1

The test specimen for Inventive Example 1 was fabricated by co-extrusion molding in the following manner: First, a polycarbonate resin was loaded into the screw cylinder of a main extruder, and was sheared and kneaded while being heated at 270° C. Thereafter, a blowing agent constituted by $N_2$ was injected at a pressure of 4 MPa. The polycarbonate resin and blowing agent were heated at 215° C. to melt, and a core layer was produced with a die-outlet temperature of 215° C. Meanwhile, a polycarbonate resin was loaded into each of the screw cylinders of auxiliary extruders, and was sheared and kneaded while being heated at 255° C., and two skin layers were produced with a die-outlet temperature of 215° C. These core and skin layers were brought together inside a die and laminated, and discharged through the die outlet. This resulted in a test specimen for Inventive Example 1 with skin layers made of a non-foaming resin laminated to both major surfaces of the core layer made of a foam resin. The co-extrusion molding of the test specimen for Inventive Example 1 occurred with such a die outlet gap that the resulting thickness T of the test specimen for Inventive Example 1 was at the relevant value shown in Table 1 and with a haul off speed of 0.7 m/min.

Inventive Examples 2 to 13 and Comparative Examples 1 to 3 and 5

The test specimens for Inventive Examples 2 to 13 and Comparative Examples 1 to 3 and 5 were all fabricated in the same manner as for Inventive Example 1. However, the test specimens for Inventive Examples 2 to 6 and Comparative Examples 1 to 3 were fabricated so as to have different thicknesses from Inventive Example 1 by changing the outlet gap of the die during extrusion molding and adjusting the haul-off speed as appropriate. Further, the test specimens for Inventive Examples 7 to 9 were fabricated so as to have the same thicknesses as the test specimen for Inventive Example 5 while the combination of polycarbonate resins used for the skin layers and core layer were varied to have different MVR ratios. The test specimens for Inventive Examples 10 to 13 were fabricated so as to have different thicknesses T and different skin-layer thicknesses from the test specimen for Inventive Example 2 while the resin material used was the same polycarbonate resin used for the test specimen for Inventive Example 5.

Comparative Example 4

The test specimen for Comparative Example 4 was fabricated by co-extrusion molding in the following manner: First, a polycarbonate resin was loaded into the screw cylinder of a main extruder, and was sheared and kneaded while being heated at 270° C. Thereafter, such an amount of a blowing agent constituted by isobutane was injected that its resulting content was 0.7 wt. %/kg resin. The polycarbonate and blowing agent were heated at 215° C. to melt, and a core layer was produced with a die-outlet temperature of 215° C. Meanwhile, a polycarbonate resin was loaded into the screw cylinders of two auxiliary extruders, and was sheared and kneaded while being heated at 255° C., and two skin layers were produced with a die-outlet temperature of 215° C. These core and skin layers were brought together inside a die and laminated, and discharged through the die outlet. This resulted in a test specimen for Comparative Example 4 with skin layers made of a non-foaming resin laminated to both major surfaces of a core layer made of a foam resin. The co-extrusion molding of the test specimen for Comparative Example 4 occurred with such a die outlet gap that the resulting thickness T of the test specimen for Comparative Example 4 was at 5.0 mm and with a haul-off speed of 2 m/min.

The dimensional change ratios were calculated in the following manner: First, a sheet-shaped test specimen was cut into a sample with a size of 120 mm by 120 mm. Here, a sample was taken from each of the middle and both ends of the entire width of the test specimen. The middle refers to the position at a distance of ½ of the entire width of the test specimen, and both ends refer to the positions 50 mm distant from the extreme ends of the entire width of the test specimen. Each sample was marked to indicate the direction of extrusion and the width direction, and the middle of each sample was marked to enable measurement of its gauge lengths in the direction of extrusion and in the width direction. The gauge lengths in the direction of extrusion and the width direction were measured using a scale ruler or a carpenter's square capable of measuring 0.5 mm at the minimum. Thereafter, a metallic container with a Teflon (registered trademark) sheet laid on its inner bottom surface was placed in a drier, and the temperature of the drier was adjusted such that the temperature of the metallic container was 200±2° C. The sample was placed in the metallic container and heated for 30 minutes. After completion of the heating process, the sample was taken out of the metallic container and was left to cool to room temperature, and the gauge lengths in the direction of extrusion and the width direction were measured. Then, the dimensional change ratio was calculated by the expression given above. For every one of the test specimens, the absolute value of the dimensional change ratio in the direction of extrusion was higher than the dimensional change ratio in the width direction; in view of this, Table 1 shows the dimensional change ratios in the direction of extrusion. In other words, for each specimen, the dimensional change ratio in the width direction was lower than the dimensional change ratio in the direction of extrusion. Thus, the dimension in the width direction was more stable during the heating than that in the direction of extrusion.

The MVR ratios shown in Table 1 were calculated by MVRs/MVRc; MVRs and MVRc were measured by the above described measurement method.

Figure 5:
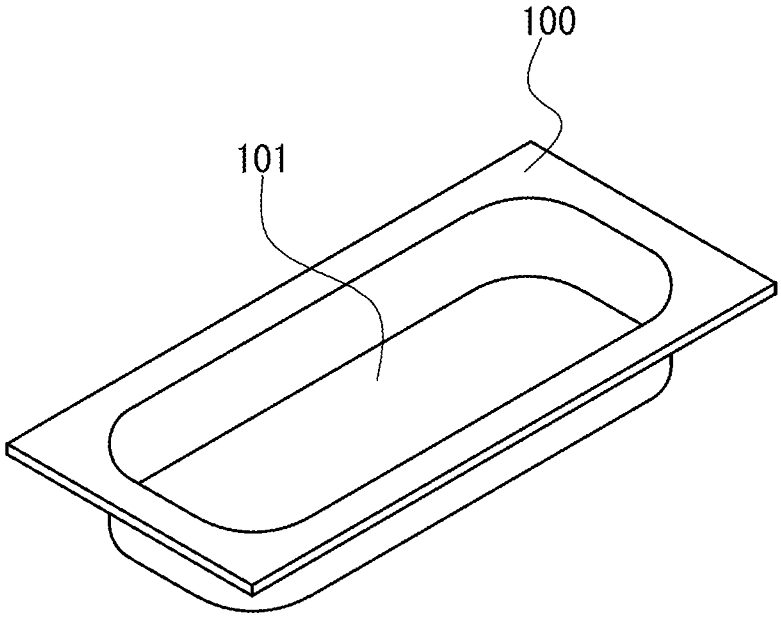
FIG. 5 is a perspective view of a vacuum forming die.

In Table 1, "Appearance of extruded sheet (mechanical strength after vacuum forming)" was determined from the swelling condition of the surface, and the bubble condition, of a molded product after vacuum forming of the relevant sheet-shaped test specimen. The bubble condition for each test specimen was measured in the following manner: First, a vacuum-forming die 100 as shown in FIG. 5 was prepared. As shown in FIG. 5, the vacuum forming die 100 had a recess 101 recessed from its top surface, and the recess 101 had a generally rectangular shape in planner view. The corners of the recess 101 were round chamfered with a radius of curvature of 15 mm, where the distance between the opposite short sides of the generally rectangular shape was 200 mm, the distance between the opposite long sides was 80 mm, and the depth of the recess 101 was 35 mm. Each test specimen was vacuum formed using this vacuum-forming die 100. In a planner view of the molded product with a container shape after vacuum forming, the molded product was cut down in the depth direction along the diagonal lines of the rectangle formed by extension lines of the short sides and extension lines of the long sides. The bubble diameter of the bubbles in this cut surface was observed. The largest diameter and the smallest diameter of the bubbles in cross-sectional view were measured, and the diameter of a circle that, in terms of surface area, corresponds to an ellipse with its major axis constituted by said largest diameter and its minor axis constituted by said smallest diameter was treated as the bubble diameter of the bubbles. A test specimen that contained bubbles with bubble diameters larger than 2 mm in cross-sectional view was determined to have merged bubbles, i.e., with decreased strength of the molded product after vacuum forming, and, if swelling was observed on the surface of the molded product, this test specimen was graded as "B" for evaluation; a test specimen that contained only bubbles with bubble diameters not larger than 2 mm was determined to have improved strength of the molded product, and, if no swelling was observed on the surface of the molded product, this test specimen was graded as "A" for evaluation.

In Table 1, "Optimum heater temp." indicates the highest temperature at which the dimensional accuracy of the relevant test specimen and its molded product after vacuum forming, or specifically the dimensional accuracy of each of the short and long sides of the molded product excluding the corners with curvature surfaces was ±2 mm and the test specimen did not experience swelling or rupturing. "Minimum pre-heating time" refers to the shortest heating time for vacuum forming at the optimum heater temperature. The vacuum forming equipment used was "Type CFS-65P" from Wakisaka Engineering Co. Ltd.

(Test Results)

The MVR ratios of Inventive Examples 1 to 13 were in the range of 1.5 to 8.0. For each of Inventive Examples 1 to 13, the appearance and mechanical strength (i.e., merging of bubbles) is graded as "A", and a reduction in minimum pre-heating time, i.e., a reduction in tact time, was observed. The minimum pre-heating time for Inventive Example 4 was relatively long presumably because its test specimen had a relatively large thickness compared with other inventive examples. This suggests that, if Inventive Example 4 had had the same thickness as Inventive Example 3, it would have had a minimum pre-heating time generally equal to that for Inventive Example 3. Further, a comparison among Inventive Examples 1 to 9 shows that tact time was reduced more if the MVR ratio was in the range of 1.5 to 2.5, and even more if not higher than 2.3. Furthermore, a comparison among Inventive Examples 3 and 7 to 9 shows that, for each of Inventive Examples 7 and 9, swelling etc. occurring on the surface of the vacuum-formed product was reduced more than for the other examples graded as "A". That is, MVR ratios in the range of 1.7 to 2.3 provided a vacuum-formed product with even better surface smoothness. A comparison among Inventive Examples 10 to 13 shows that Inventive Example 12 had a relatively long minimum pre-heating time due to its high ratio of the thickness of the skin layers to the thickness of the test specimen. It is assumed that the thicker skin layers required more time for heat conduction to the core layer. Although not shown in Table 1, Inventive Example 10 had decreased flexural modulus compared with Inventive Examples 11 to 13. It is assumed that Inventive Example 10 experienced a decrease in flexural modulus due to its thin skin layers. Further, for each of Inventive Examples 1 to 13, a further reduced dimensional change ratio was observed due to their MVR ratios in the range of 1.5 to 8.0. While Comparative Example 1 is graded as "A" for evaluation of appearance and mechanical strength, its minimum pre-heating time was relatively long. This is presumably because the MVR ratio of Comparative Example 1 was 8.57, which is relatively high, and the minimum pre-heating time was long, preventing bubbles from merging.

REFERENCE SIGNS LIST

1: co-extruded sheet
2: core layer
3: skin layer
4: skin layer
11: swollen portion
T: thickness
t1: thickness
t2: thickness
t3: average thickness
t4: average thickness
t5: thickness

The invention claimed is:

1. A co-extruded sheet containing a polycarbonate resin, comprising:

a core layer formed from a foam resin;

a first skin layer formed from a non-foaming resin and laminated to one major surface of the core layer; and a second skin layer laminated to another major surface of the core layer, wherein a melt volume-flow rate of a polycarbonate resin contained in the core layer (hereinafter referred to as MVRc) and a melt volume-flow rate of a polycarbonate resin contained in one of the first and second skin layers (hereinafter referred to as MVRs) satisfy the following expression; (1):

$$1.5 \leq MVRs/MVRc \leq 8.0, \text{ and} \tag{1}$$

wherein the MVRs and the MVRc are measured by measuring the resin materials contained in the first skin layer, the second skin layer and the core layer at a measurement temperature of 300° C. and a load of 1.2 kg.

2. The co-extruded sheet according to claim 1, wherein the co-extruded sheet has an apparent density of 0.4 to 0.8 g/cm$^3$.

3. The co-extruded sheet according to claim 1, wherein the co-extruded sheet has a thickness of 1.5 to 6 mm.

4. The co-extruded sheet according to claim 1, wherein the co-extruded sheet satisfies the following expression; (4):

$$0.10 \leq (t1 + t2)/T \leq 0.5, \tag{4}$$

in expression (4), t1 indicates a thickness of the first skin layer, t2 indicates a thickness of the second skin layer, and T indicates a thickness of the co-extruded sheet.

5. The co-extruded sheet according to claim 1, wherein the co-extruded sheet has an apparent density of 0.62 to 0.8 g/cm$^3$.

6. The co-extruded sheet according to claim 1, wherein the co-extruded sheet satisfies the following expression (2):

$$1.5 \leq MVRs/MVRc \leq 2.5. \tag{2}$$

7. The co-extruded sheet according to claim 6, wherein the co-extruded sheet 1 satisfies the following expression (3):

$$1.7 \leq MVRs/MVRc \leq 2.3. \quad (3)$$

8. A resin-molded product made from the co-extruded sheet according to claim 1.

9. A resin-molded product made from the co-extruded sheet according to claim 4.

* * * * *